US006862645B2

(12) United States Patent
Garnett

(10) Patent No.: US 6,862,645 B2
(45) Date of Patent: Mar. 1, 2005

(54) COMPUTER SYSTEM

(75) Inventor: Paul Garnett, Camberley (GB)

(73) Assignee: Sun Microsystems, Inc., Santa Clara, CA (US)

( * ) Notice: Subject to any disclaimer, the term of this patent is extended or adjusted under 35 U.S.C. 154(b) by 478 days.

(21) Appl. No.: 09/766,246

(22) Filed: Jan. 19, 2001

(65) Prior Publication Data

US 2004/0225792 A1 Nov. 11, 2004

(30) Foreign Application Priority Data

Aug. 14, 2000  (GB) .............................................. 0019978

(51) Int. Cl.⁷ ............................................. G06F 13/36
(52) U.S. Cl. ......................... 710/306; 710/311; 714/12
(58) Field of Search ................. 710/309, 308, 710/306, 311; 714/3, 12, 9, 43, 56

(56) References Cited

U.S. PATENT DOCUMENTS

| | | | |
|---|---|---|---|
| 5,175,847 A | * 12/1992 | Mellott ......................... | 714/12 |
| 5,226,152 A | * 7/1993 | Klug et al. .................... | 714/12 |
| 5,671,435 A | 9/1997 | Alpert | |
| 5,675,825 A | 10/1997 | Dreyer et al. | |
| 5,790,834 A | 8/1998 | Dreyer et al. | |
| 5,991,900 A | * 11/1999 | Garnett ......................... | 714/56 |
| 6,473,869 B2 | * 10/2002 | Bissett et al. ................. | 714/12 |

FOREIGN PATENT DOCUMENTS

| | | |
|---|---|---|
| GB | 2 260 430 | 4/1993 |
| GB | 2 290 891 | 1/1996 |

* cited by examiner

Primary Examiner—Khanh Dang
(74) Attorney, Agent, or Firm—Meyertons Hood Kivlin Kowert & Goetzel, P.C.; B. Noël Kivlin

(57) ABSTRACT

A computer system is arranged to provide protection against faults. The computer system comprises a plurality of processing sets (14, 16), each having at least one processor (52) and a bridge (12) coupled to each of the processing sets (14, 16) and operable to monitor a step locked operation of said processing sets (14, 16). Each of the processors (52) has a processor identification register (64) which is read/writeable and is operable to store in the register data representative of a processor identification. The processors (14, 16) are arranged, consequent upon a masking condition, to load a common predefined data value into the processor identification register, which predefined common data value has an effect of masking the processor identification. The erroneous detection by the bridge (12) of a fault condition resulting from functionally the same processors having a different processor identification is thereby avoided, or at least the likelihood of a false detection reduced. The masking condition may be, for example, a boot or re-boot of a processing set, or a forced re-configuration or initialization of the processing system instigated by an operating system.

17 Claims, 6 Drawing Sheets

| Bits | Field | Use | RW |
|---|---|---|---|
| <63:48> | *manuf* | Manufacturer identification | R |
| <47:32> | *impl* | Implementation identification | R |
| <31:24> | *mask* | Mask set version | R |
| <23:16> | *Reserved* | — | R |
| <15:8> | *maxtl* | Maximum trap level supported | R |
| <7:5> | *Reserved* | — | R |
| <4:0> | *maxwin* | Maximum number of windows of integer register file. | R |

Fig 5

COMPUTER SYSTEM

BACKGROUND OF THE INVENTION

The invention relates to computer systems having first and second processing sets, each of which may comprise one or more processors, which communicate with an I/O device bus.

More particularly, the present invention relates to fault tolerant computer systems in which the first and the second processing sets are arranged to communicate with the I/O device bus in a step locked manner, with provision for identifying lockstep errors in order to detect faulty operation of the computer system.

Generally it is desirable to provide fault tolerant computer systems with a facility for not only detecting faults, but also for automatically recovering from the detected faults. By detecting and recovering from the detect faults, the computer system is provided with higher degree of system availability.

Automatic recovery from an error provides significant technical challenges. This is because a computer system has to be arranged to continue operating following fault detection to the effect of maintaining functional system performance of the system, whilst permitting diagnostic operations to be performed to locate and remedy the fault.

The applicant has disclosed in a co-pending international patent application Ser. No. US99/124321, corresponding to U.S. patent application Ser. No. 09/097,485, a fault tolerant computer system in which first and second processing sets are connected via an I/O device bus to a bridge. The bridge operates to monitor the step locked operation of the processing sets, each processing set being arranged to operate in accordance with substantially identical software. The software includes for example an operating system of the computer system. If the bridge detects that one of the first or the second processing sets departs from the step locked operation with respect to the other processing set, then it is assumed that a fault or error condition has occurred. Interrogation and analysis is then performed by the operating system following error reports from the bridge. The operating system determines which of the first or the second processing sets is in error, or whether another device was in error, and takes corrective action. This fault detection and diagnosis is provided through the locked stepped operation of the processing sets as monitored by the bridge.

Although the step locked operation provides an effective system for detecting faults, because the two processing sets are effectively operating autonomously some conditions can occur in which the two processing sets do not operate in lock step even though an error has not occurred.

SUMMARY OF THE INVENTION

Particular and preferred aspects of the invention are set out in the accompanying independent and dependent claims. Combinations of features from the dependent claims may be combined with features of the independent claims as appropriate and not merely as explicitly set out in the claims.

In accordance with one aspect of the invention, there is provided a computer system comprising a plurality of processing sets, each of the processing sets comprising at least one processor, and a bridge coupled to each of the processing sets and operable to monitor a step locked operation of the processing sets, wherein each of the processors has a processor identification register which is read/writeable and is operable to store in the register data representative of a processor identification, the processors being arranged, consequent upon a predetermined condition, to load a common predefined data value into the processor identification register.

Processors are typically provided with a processor identification which is for example a binary number loaded into a register, which may include manufacturer specific information, and/or other information relating to the status or configuration of the processor. The processor identification is provided to identify not only the processor, but also the version of the processor. The version number is provided because there may be no logical change in the structure and operation of the processor, however an update of the processor may occur to improve the manufacturing yield of the processor, or to increase the maximum speed of operation of the processor, although otherwise without a functional or logical change. The processor identification may therefore include, for example, data fields comprising the manufacturer's identification, an implementation identification, and a mask set version.

If the version number has changed between two processors which form part of different processing sets of a fault tolerant computer system the difference in the version numbers of the processors can cause errors to be wrongly detected as a result of the difference in processor numbers. For example, some processors include the processor identification as a field or fields of a word held in a register, which also includes other configuration information, which is required by the operating system being executed by the processor. This configuration information may be, for example, the number of registers or the maximum number of supported trap levels beyond level 0 supported by the processor. As such, during execution, the information held in the version identification register will be read by the operating system, and stored in memory. If this data is then read out of memory, sometime later, as a memory exchange as part of a virtual memory swap, then the version identification may be detected on the data bus by the bridge, and, therefore falsely diagnosed as a processing set error, because the version numbers of the processors in the processing sets differ.

Embodiments of the present invention address this technical problem by providing the processor with a processor identification register which is read/writeable, and arranging, consequent upon a masking condition, for a predefined common data value, which is common to all processing sets, to be loaded into the version register.

The predetermined condition may be, for example, a boot or re-boot of a processing set, or a forced re-configuration or initialization of the processing set instigated by the operating system.

In a particular embodiment of the invention, each of the processing sets may include a boot memory unit storing data which is representative of initialization code, which when read by the processor serves to initialize the processing set to operate within the computer system, the boot memory unit including the common predefined data value which is loaded by the processor into the processor identification register. In this embodiment, the boot memory may be a Boot PROM, or the like. The predefined value is loaded into the version register as part of instructions received from a Boot PROM, which are read and executed during a boot or re-boot. The boot or re-boot may be initiated following a "hot insertion" of a processing set, or following a forced re-configuration or initialization of the processing system by, for example the operating system.

According to an aspect of the invention there is provided a processor for use in a processing set forming part of a fault tolerant computer system, the processor comprising an interface for communication with an I/O bus, and a process identification register which is read/writeable, and has stored in the register data representative of a processor identification, wherein the processor is arranged, to write a common predefined data value received via the I/O bus into the processor identification register.

An aspect of the invention also provides a method of operating a fault tolerant computer system comprising a plurality of processing sets, each of which processing sets is connected to a bridge, each of the processing sets having at least one processor, the method comprising the steps of;

a) detecting a predetermined condition representative of a state in which the processor identification is present in a process identification register of the processor; and b) loading a common predefined data value into the processor identification register of each of the processors which predefined data value has an effect of masking the processor identification.

BRIEF DESCRIPTION OF THE DRAWINGS

Exemplary embodiments of the present invention will be described hereinafter, by way of example only, with reference to the accompanying drawings in which like reference signs relate to like elements and in which:

FIG. 5 is table providing an example illustration of data fields which may form part of a processor identification register;

DESCRIPTION OF THE PREFERRED EMBODIMENTS

To facilitate understanding of the advantages provided by embodiments of the present invention, an example of a fault tolerant computer system will be presented in the following paragraphs with reference to FIGS. 1 and 2. It will be appreciated however that the present invention finds application with any computer system which is arranged to operate with some duplication of processors.

Figure 1:
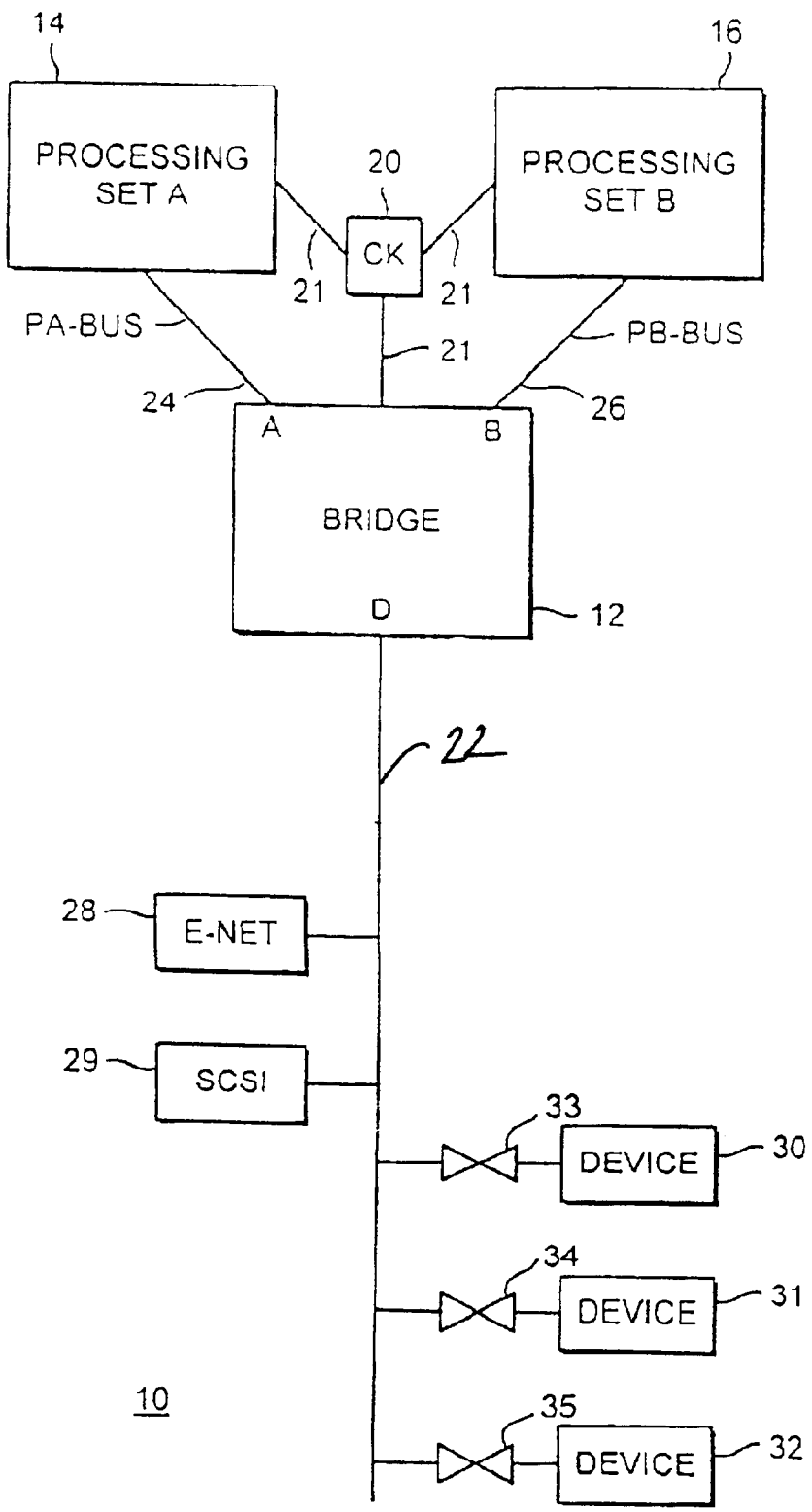
FIG. 1 is a schematic overview of a fault tolerant computer system.

FIG. 1 is a schematic overview of a fault tolerant computing system 10 comprising a plurality of CPU sets (processing sets) 14, 16 and a bridge 12. As shown in FIG. 1, there are two processing sets 14, 16, although in other embodiments there may be three or more processing sets. The bridge 12 forms an interface between the processing sets and I/O devices such as devices 28, 29, 30, 31, 32. In this document, the term "processing set" is used to denote a group of one or more processors, possibly including memory, which output and receive common outputs and inputs. It should be noted that the alternative term mentioned above, "CPU set", could be used instead, and that these terms could be used interchangeably throughout this document. Also, it should be noted that the term "bridge" is used to denote any device, apparatus or arrangement suitable for interconnecting two or more buses of the same or different types.

The first processing set 14 is connected to the bridge 12 via a first processing set I/O bus (PA bus) 24, in the present instance a Peripheral Component Interconnect (PCI) bus. The second processing set 16 is connected to the bridge 12 via a second processing set I/O bus (PB bus) 26 of the same type as the PA bus 24 (i.e. here a PCI bus). The I/O devices are connected to the bridge 12 via a device I/O bus (D bus) 22, in the present instance also a PCI bus.

The processing sets 14, 16 and the bridge 12 are operable in synchronism under the control of a common clock 20, which is connected thereto by clock signal lines 21.

Some of the devices including an Ethernet (E-NET) interface 28 and a Small Computer System Interface (SCSI) interface 29 are permanently connected to the device bus 22, but other I/O devices such as I/O devices 30, 31, 32 can be hot insertable into individual switched slots 33, 34 and 35. Dynamic field effect transistor (FET) switching can be provided for the slots 33, 34 and 35 to enable hot insertability of the devices such as devices 30, 31, 32. The provision of the FETs enables an increase in the length of the D bus 22 as only those devices which are active are switched on, reducing the effective total bus length. It will be appreciated that the number of I/O devices which may be connected to the D bus 22, and the number of slots provided for them, can be adjusted according to a particular implementation in accordance with specific design requirements.

Figure 2:
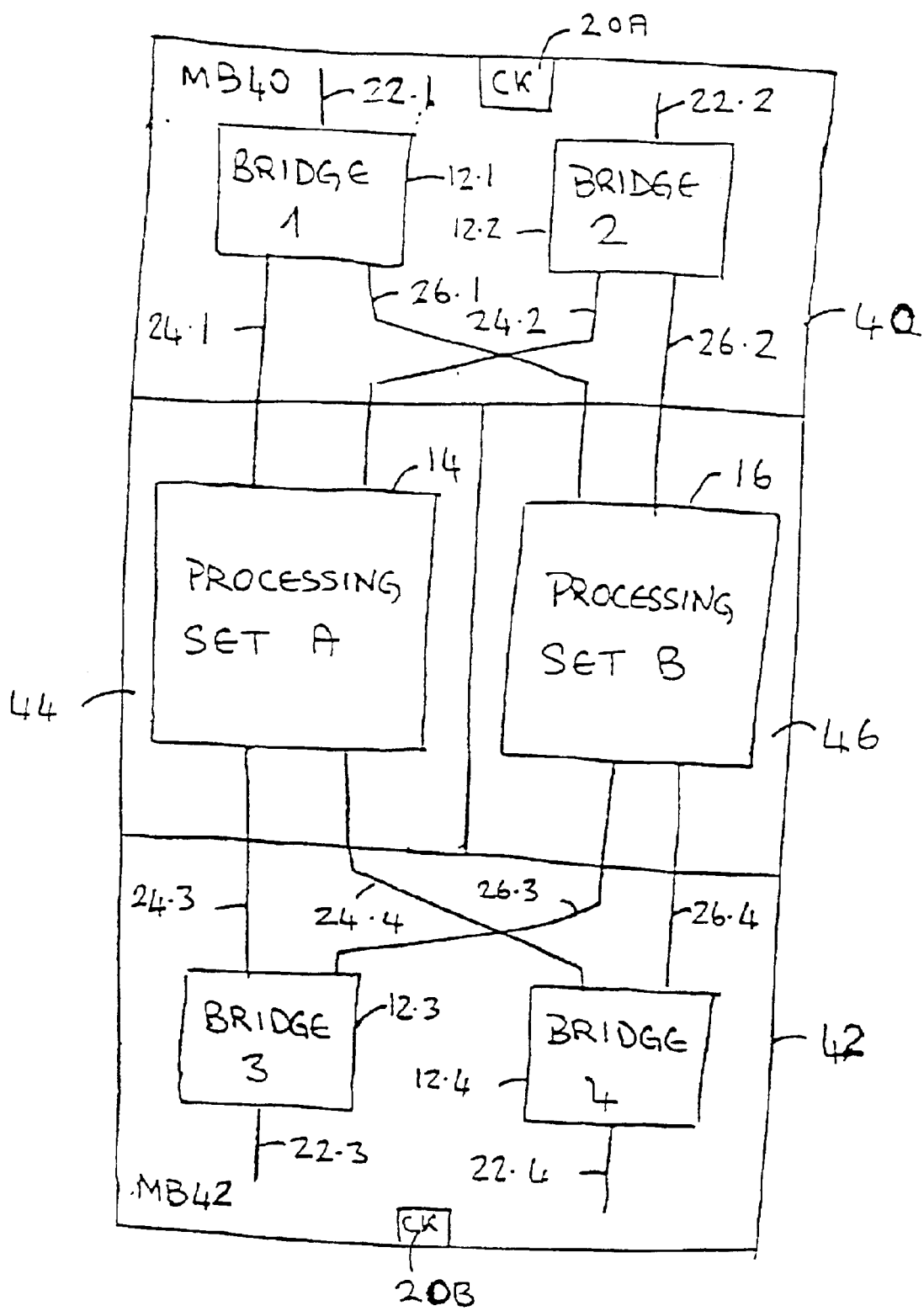
FIG. 2 is a schematic overview of a specific implementation of a system based on that of FIG. 1.

FIG. 2 is a schematic overview of a particular implementation of a fault tolerant computer employing a bridge structure of the type illustrated in FIG. 1. In FIG. 2, the fault tolerant computer system includes a plurality (here four) of bridges 12 on first and second I/O motherboards (MB 40 and MB 42) in order to increase the number of I/O devices which may be connected and also to improve reliability and redundancy. Thus, in the embodiment shown in FIG. 2, the two processing sets 14, 16 are each provided on a respective processing set board 44, 46, with the processing set boards 44, 46 'bridging' the I/O motherboards MB 40 and MB 42. A first, master clock source 20A is mounted on the first motherboard 40, a second, slave clock source 20B is mounted on the second motherboard 42. Clock signals are supplied to the processing set boards 44, 46 via respective connections (not shown in FIG. 2).

First and second bridges 12.1, 12.2 are mounted on the first I/O motherboard 40. The first bridge 12.1 is connected to the processing sets 14, 16 by P buses 24.1, 26.1, respectively. Similarly, the second bridge 12.2 is connected to the processing sets 14, 16 by P buses 24.2, 26.2, respectively. The bridge 12.1 is connected to an I/O databus (D bus) 22.1 and the bridge 12.2 is connected to an I/O databus (D bus) 22.2.

Third and fourth bridges 12.3, 12.4 are mounted on the second I/O motherboard 42. The bridge 12.3 is connected to the processing sets 14, 16 by P buses 24.3, 26.3, respectively. Similarly, the bridge 12.4 is connected to the processing sets 14, 16 by P buses 24.4, 26.4, respectively. The bridge 12.3 is connected to an I/O databus (D bus) 22.3 and the bridge 12.4 is connected to an I/O databus (D bus) 22.4.

It can be seen that the arrangement shown in FIG. 2 can enable a large number of I/O devices to be connected to the two processing sets 14 and 16 via the D buses 22.1, 22.2, 22.3 and 22.4 for either increasing the range of I/O devices available, or providing a higher degree of redundancy, or both.

Figure 3:
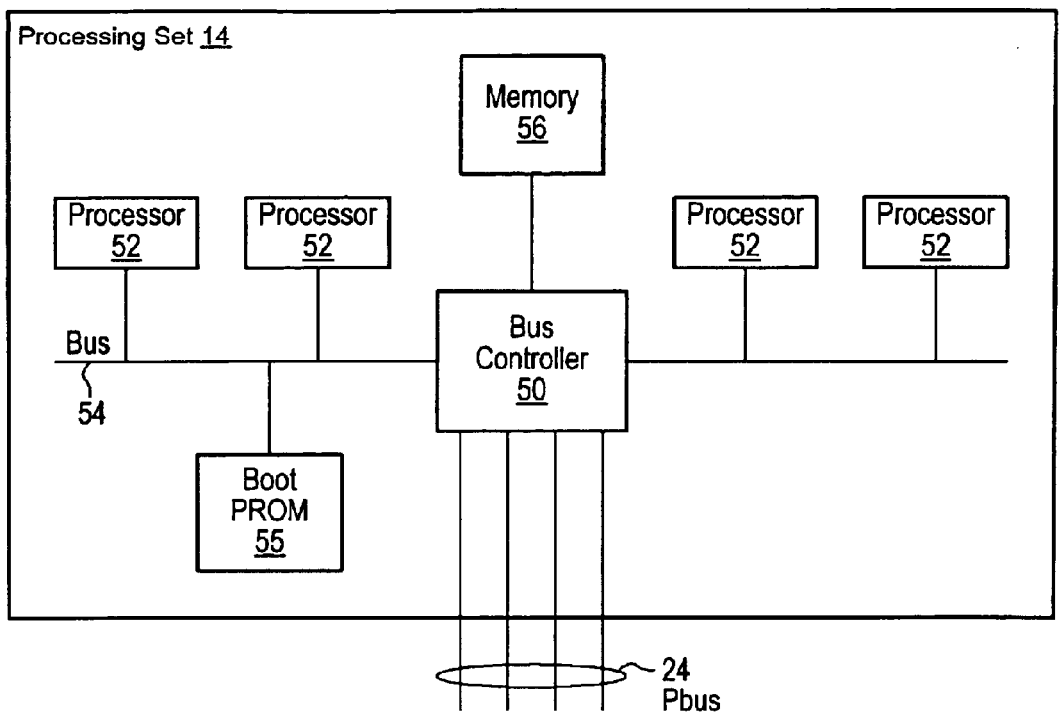
FIGS. 3 and 4 are schematic diagrams of examples of processing sets.

FIG. 3 is a schematic overview of one possible configuration of a processing set, such as the processing set 14 of FIG. 1. The processing set 16 could have the same configuration. In FIG. 3, a plurality of processors (here four) 52 are connected by one or more buses 54 to a processing set bus controller 50. Also connected to the buses 54 is a boot programmable read only memory (Boot PROM) 55. The purpose and function of the Boot PROM 55 will be described shortly.

As shown in FIG. 3, one or more processing set output buses 24 are connected to the processing set bus controller 50, each processing set output bus 24 being connected to a respective bridge 12. For example, in the arrangement of FIG. 1, only one processing set I/O bus (P bus) 24 would be provided, whereas in the arrangement of FIG. 2, four such processing set I/O buses (P buses) 24 would be provided. In the processing set 14 shown in FIG. 3, individual processors operate using the common memory 56, and receive inputs and provide outputs on the common P bus(es) 24.

Figure 4:
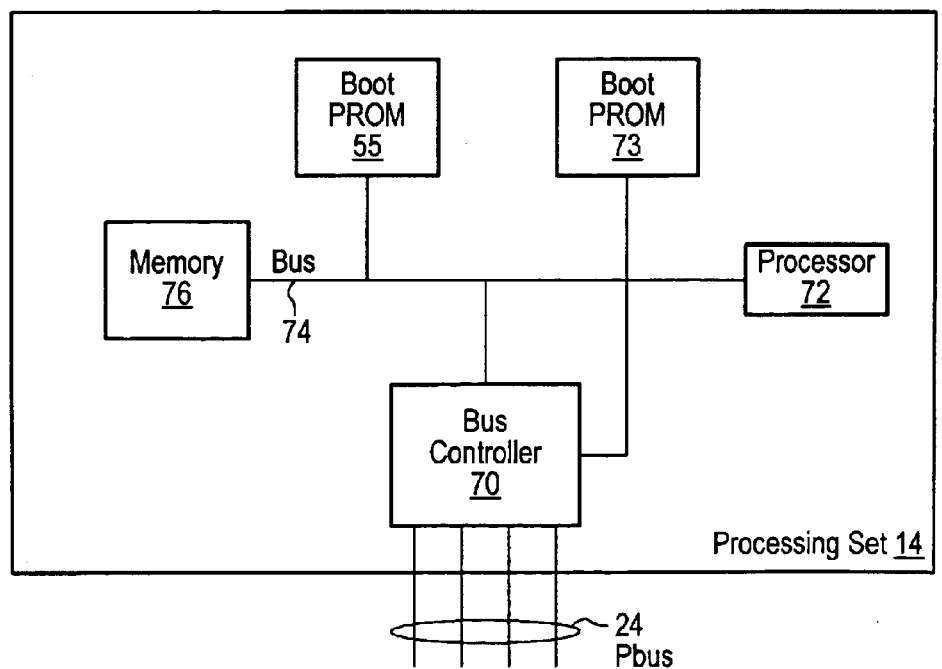

FIG. 4 illustrates an alternative configuration of a processing set, such as the processing set 14 of FIG. 1. Here a simple processing set includes a single processor 72 and associated memory 76 connected via a common bus 74 to a processing set bus controller 70. The processing set shown in FIG. 4 also includes a Boot PROM 73. The processing set bus controller 70 provides an interface between the internal bus 74 and the processing set I/O bus(es) (P bus(es)) 24 for connection to the bridge(s) 12.

Accordingly, it will be appreciated from FIGS. 3 and 4 that the processing set may have many different forms and that the particular choice of a particular processing set structure can be made on the basis of the processing requirement of a particular application and the degree of redundancy required. In the following description, it is assumed that the processing sets 14, 16 referred to have a structure as shown in FIG. 3, although it will be appreciated that another form of processing set could be provided.

The bridge(s) 12 are operable in a number of operating modes. These are described in detail in co-pending international patent application, serial number US99/124321. However to facilitate understanding and to illustrate the advantages of embodiments of the present invention a brief explanation of the operation of the bridge 12 is provided in the following paragraphs.

The bridge can be described as operating generally in one of two modes. In a first, combined mode, a bridge 12 is operable to route addresses and data between the processing sets 14 and 16 (via the PA and PB buses 24 and 26, respectively) and the devices (via the D bus 22). In this combined mode, I/O cycles generated by the processing sets 14, 16 are compared to ensure that both processing sets are operating correctly. Comparison failures force the bridge 12 into an error limiting mode (EState) in which device I/O is prevented and diagnostic information is collected. In a second, split mode, the bridge 12 routes and arbitrates addresses and data from one of the processing sets 14, 16 onto the D bus 22 and/or onto the other one of the processing sets 14, 16 respectively. In this mode of operation, the processing sets 14, 16 are not synchronized and no I/O comparisons are made. DMA operations are also permitted in both modes. Therefore, once an error condition has been detected by bridge 12 following a comparison failure, the bridge operates in the split mode to diagnose the error and to recover automatically from the error, by for example re-setting the faulty processing set.

As already explained above, processors often contain a register in which version identification data of the processor is held. The version identification data may include one or more data fields, which contain information inter alia, for identifying the processor revision. In the following description this will be referred to as the version number, although as will be appreciated the version identification could by any alpha-numeric characters providing an identification of the processor version.

The presence of a different version identification number in a processor which forms part of a fault tolerant computing system described above provides a technical problem because processors within the fault tolerant computer system may have different version numbers although functionally and logically may operate substantially identically. An example of such a processor is the Sun Microsystems Ultra Sparc (Trademark) 1 and 2. As explained on page 241 of the Sun Ultra Sparc 1 and 2 Users Manual January 1997, the version register of the Ultra Sparc Processor includes two fields which identify the processor and identify the implementation of the processor as well as a mask set version. The fields of the version register are reproduced as an example of version identification data in the table shown in FIG. 5. These fields will vary in accordance with a particular implementation of the processor. These fields form part of a 64 bit data word which include a field indicative of the maximum trap level supported (MAXTL) and a field indicative of the maximum number of windows of an integer register file (MAXWIN). As such, the version register will be interrogated by the operating system, and the contents may be stored in the memory units 56, 76 of the processing sets 14, 16. This is because the MAXTL and MAXWIN fields are required by the operating system in order to execute correctly. As a result there can exist in the memory units 56, 76 data values which will differ between the processing sets. As a result when the version identification data is loaded onto the I/O bus by the operating system, such as for example during a memory swap as part of a virtual memory access, a divergence will be caused between the data values which are put on to the PA-bus 24 and PB-bus 26. This may be detected by the bridge 12 as an error even though both processing sets 14, 16 of the computer system are operating correctly.

Embodiments of the present invention provide an arrangement in which the version register or at least the part of the version register which contains the processor identification is made to be read/writeable, and to write into the version register a predefined value which is common to all processors within the computer system. As a result the false detection of an error in the system is prevented or at least the likelihood of a false detection of an error reduced. An example of such a processor is shown in FIG. 6.

Figure 6:
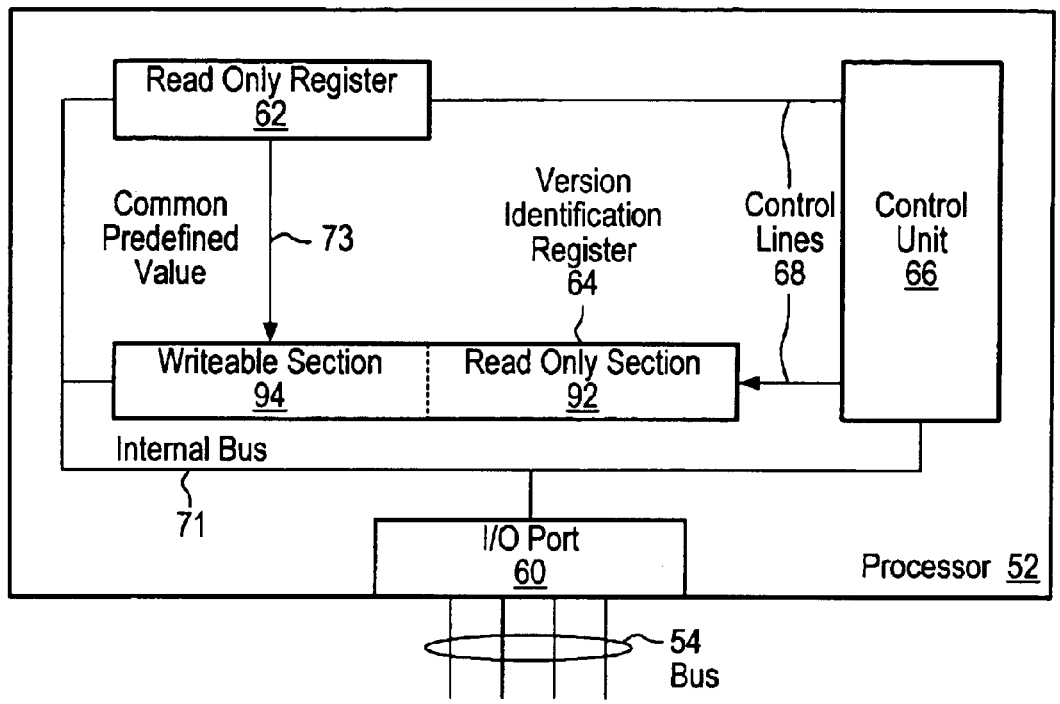
FIG. 6 is an example block diagram of parts of a processor in accordance with an embodiment of the present invention.

In FIG. 6 an example processor 52 is provided with an I/O port or ports 60 for connection to the bus(es) 54 of the processing sets shown in FIG. 3. The bus I/O port 60 provides a means for communicating instructions, data and addresses to and from the processor 52. The bus(es) 54 therefore provide both data and address buses for the processor 52.

The processor 52 contains a read only register 62 and a read/writeable register 64. The read/writeable register 64 forms the version identification register, and is arranged to receive the contents of the read only register 62 under control of a control unit 66 via the internal bus 71. The control unit 66 is coupled to the read only register 62 and the version identification register 64 via control lines 68. In operation on power-up, the contents of the read only register 62 are written under control of the control unit 66 into a writeable part 94 of the version identification register 64. In this mode therefore the manufacturer's version identification data identifying the processor, the implementation identification and the mask set version, for example, are loaded into the corresponding field or fields of the version identification register 64. According to the example present in the table shown in FIG. 5, the version identification register 64 may contain other configuration information such as MAXTL and MAXWIN, which may be loaded permanently in a read only section 92 of the register 64, as will be explained shortly.

On receipt of a command from the bus 54 as communicated to the control unit 66 via the I/O port 60, a common predefined value received with the command is arranged to be latched into a writeable part 94 of the read/writeable version register 64 via the internal bus 71. Alternatively, the common predefined value could not be communicated with the command but arranged to be an implicit value such as 0.

In this embodiment, the read/writeable version register 64 is divided into two parts, with the first part 92 containing information appertaining to the configuration of the processor 52. For example, as shown in the table of FIG. 5, this information might include the maximum trap level supported and the maximum number of windows of integer register file (MAXTL and MAXWIN). As such these processor specific parameters may be held in a first part 92 of the version register 64. The first part 92 of the version register 64 is made to be a read only part and so is not overwritten by either the information from the read only register 62 or the common predefined value written into the second part 94 of version register 64 which is loaded from the bus 54 via the internal bus 71. In this way only the processor identification information is overwritten by the common predefined value or the true processor identification value from the read only register 62. In FIG. 6, which is represented schematically by an arrow 73.

Returning to FIG. 3, the operation performed by the processor 52 to the effect of masking the processor identification number will now be explained in the context of the fault tolerant computer system.

Following system boot up or re-boot, the contents of the Boot PROM 55, which contains configuration and initialisation code are accessed by the processors 52 via the bus 54. The configuration and initialisation code contained in the Boot PROM 55 includes instructions to load a common predefined value which is received by the processor 52 via the bus 54. The instructions instructs the processor to load the common predefined value into the version register 64. In preferred embodiments, the common predefined value is supplied with the instructions from the Boot PROM 55. In this way the true processor identification which is initially loaded into the version register 64 from the read only register 62 is masked with the common predefined value. The common predefined value may be an all zeros value which can be easily identified and recognised as being a default processor identification and as such is recognised as not reflecting the true processor identification.

Figure 8:
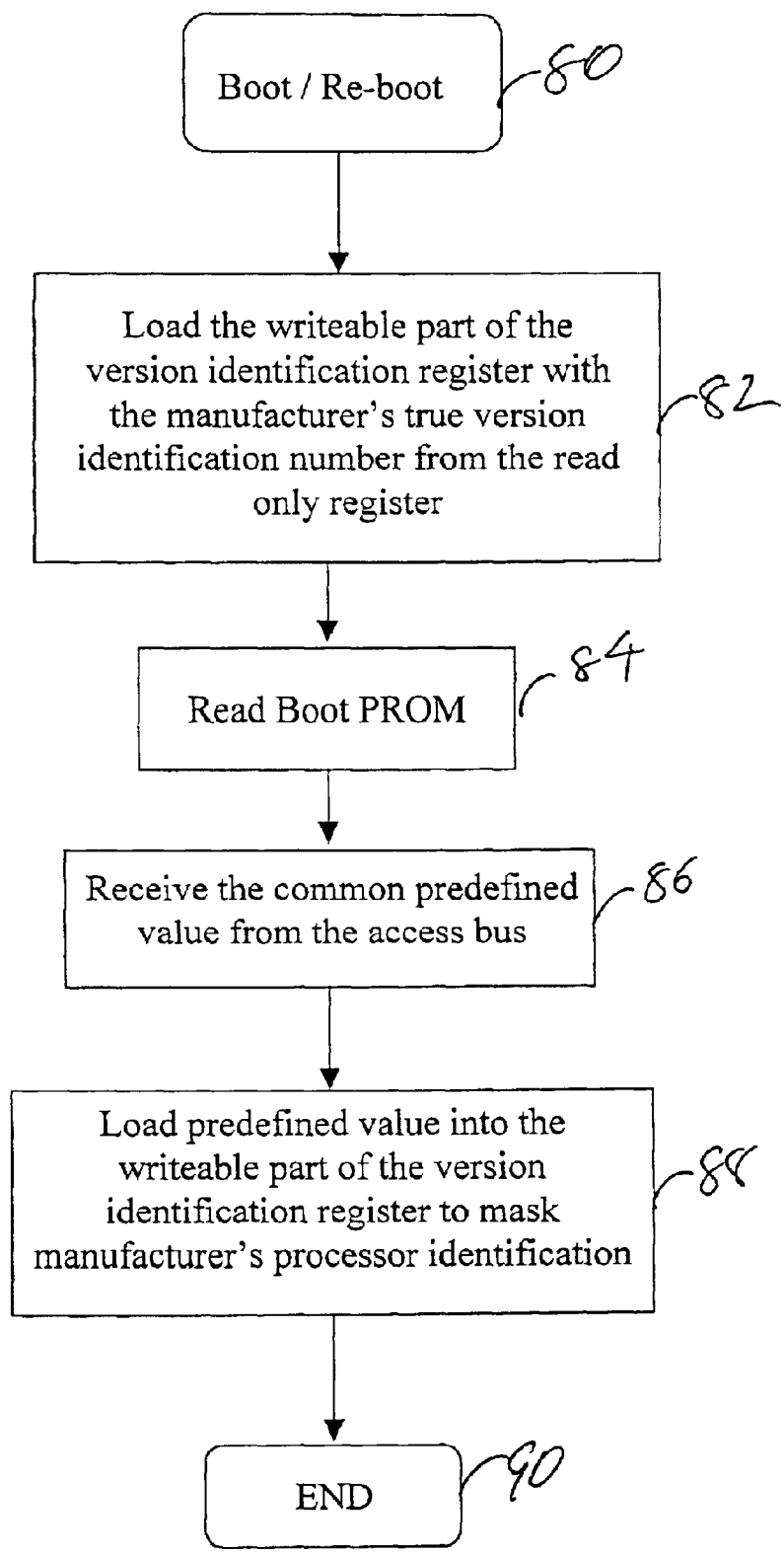
FIG. 8 is a flow diagram illustrating a process for writing a common predefined value into the processor identification register of the processor shown in FIG. 6.

The steps and operation of the process through which the version identification number is replaced by the common predefined value is illustrated by the flow diagram shown in FIG. 8. In FIG. 8 following a boot/re-boot at step 80 the processor at step 82 operates to load the version register 64 with the processor identification held in the read only memory 62. At this point in the process the manufacturer's true processor identification data is present in the read/writeable version register 64 and so may be interrogated by a diagnostics system to determine the true version number of the processor. However at step 84, the processor is initialised with the configuration and initialisation code held in the Boot PROM 55.

The re-boot step 84 may be initiated for a number of reasons, referred to generally as a masking condition. It will be appreciated however that the following are just examples and other situations may occur in which the masking operation is effected. The term "masking condition" should therefore be interpreted as including any event or state for which the processor identification in the processor identification register should be masked. For example if the fault tolerant computer system detects that a processing set is in error, the operating system running on the processing set which is not in error may initiate a re-initialisation and re-boot the processing set at which point the code within the Boot PROM 53 is read by the processors. Alternatively, if it has been ascertained that a processing set is in error and is replaced, then after a "hot insertion" of a new processing set within a motherboard of the computer system, the new processing set is re-booted at which point again the code within the Boot PROM 53 is read by the processors 52 in the processing set. A third alternative might be for example if the entire computer system is powered down at which point a boot-up follows and again the code within the Boot PROM 53 is read by the processors within each of the processing sets.

At processing step 86, the code within the Boot PROM is read by each of the processors within the processing set and an instruction to load the common predefined value received from the data bus 54 is executed by the processors 52 and the common predefined value is loaded into the version register 64. This is effected at processing step 88. At processing step 90 the process of masking the processor identification is completed.

As an alternative embodiment, the read/writeable version register 64 may not be divided into two parts, but the entire word length of the register may be read/writeable. For this embodiment the read only register 62 will contain the information appertaining to the configuration of the processor 52, as well as the manufacturer's processor identification. The same configuration information is therefore provided with the common predefined value and loaded from the buses 54.

As will be appreciated the example processing set shown in FIG. 4 could also be implemented with the processor shown in FIG. 6.

Figure 7:
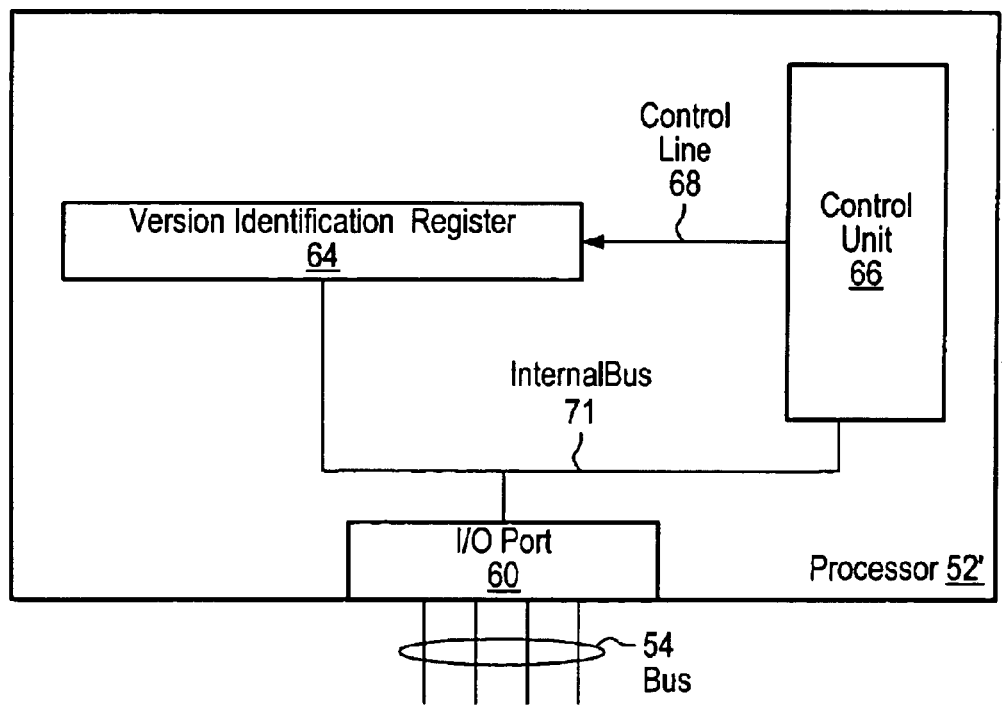
FIG. 7 is an example block diagram of parts of a processor in accordance with a further embodiment of the present invention.

A further example of an implementation of a processor according to an alternative embodiment of the present invention is shown in FIG. 7. The processor 52' shown in FIG. 7 corresponds substantially to the processor shown in FIG. 6 except that the processor in FIG. 7 does not include a read only register 62. In this case, the version register 64 is again read/writeable however this register is loaded by the manufacturer with the manufacturer's true processor identification fields. Therefore, these processor identification fields remain with the other configuration fields within the version register 64 until and unless they are overwritten with the common predefined identification as described for the processor shown in FIG. 6. Therefore for this embodiment of the invention the flow diagram describing the operation of the computer system which appears in FIG. 7 is correspondingly executed with the exception that step 82 of the process is omitted. For this embodiment, the read/writeable version register 64 and the read only memory 62 are non-volatile semi-conductor memories such as flash or EEPROM allowing the version registers to be permanently programmable.

According to a further embodiment of the invention, the common predefined value may be the processor identification of one of the processors of one of the processing sets in the computer system. In this way, all of the processors of the system may be arranged to be matched to the same processor identification. To this end, the operating system may interrogate the processor identification register of one of the processors to identify the processor identification. This processor identification is then used as the common predefined value, which is provided to the newly introduced processing set on re-boot. Alternatively, the operating system may identify the processor identification of all of the processors and select one of these processor identifications as the common predefined value. The common predefined value may be redefined if the processor corresponding to the processor identification is contained in the processor set which has been replaced by a new processing set. In this case, the processor identification of one of the other processors is selected as the processing common predefined value.

As will be appreciated the embodiments of the invention herein before described are provided as illustrative examples and various modifications may be made without departing from the scope of the present invention. In particular, the processors embodying the present invention may be used in any computer system in which more than one of the processors are arranged to execute substantially identical software which is monitored by a bridge or the like.

What is claimed is:

1. A computer system comprising:
    a plurality of processing sets, each having at least one processor, and
    a bridge coupled to each of said processing sets and operable to monitor a step locked operation of said processing sets, wherein
    each of said processors comprises a processor identification register which is read/writeable and is configured to store in said register data representative of a processor identification, each of said processors being configured, consequent upon a predetermined condition, to load a common predefined data value that is common to said processing sets into its processor identification register.

2. A computer system as claimed in claim 1, wherein said predetermined condition is a reset state of at least one of said plurality of processors.

3. A computer system as claimed in claim 2, wherein said reset state is a state asserted in said computer system following boot or re-boot.

4. A computer system as claimed in claim 1, wherein each of said processing sets includes a boot memory unit storing data which is representative of initialization code arranged to initialize said processor to operate within said computer system, said boot memory unit including said common predefined data value which is loaded by said processor into said processor identification register.

5. A computer system as claimed in claim 4, wherein said boot memory unit is a programmable read-only memory.

6. A computer system as claimed claim 1, wherein said common predefined data value is an all zeros value.

7. A computer system as claimed in claim 1, wherein each of said processors further includes a read only register having stored therein said processor identification data.

8. A computer system as claimed in claim 7, wherein said processor identification data stored in said read only register is loaded, upon initialization into said processor identification register.

9. A computer system as claimed in claim 1, wherein said common predefined value is a processor identification of one of the processors of said computer system, said processor identification of each of said processors being matched.

10. A processor for use in a processing set forming part of a fault tolerant computer system that includes a plurality of processing sets, said processor comprising:
    an interface for communication with an I/O bus, and
    a processor identification register coupled to said interface, said register is read/writeable and is configured to store data representative of a processor identification, wherein said processor is responsive to a masking condition, to write a common predefined data value received via said I/O bus into said processor identification register, wherein said predefined data value is common to said processing sets and is operable to mask said data representative of a processor identification.

11. A processor as claimed in claim 10, comprising a read only register having stored therein said processor identification data, wherein said processor identification data stored in said read only register is loadable, upon initialization into said processor identification register.

12. A method of operating a fault tolerant computer system comprising a plurality of processing sets, each of which processing sets is connected to a bridge, each of said processing sets having at least one processor, at least a first processor in said computer system comprising a processor identification register, said method comprising the steps of:
    detecting a predetermined condition representative of a state in which a processor identification is present in the processor identification register of said first processor; and
    loading a common predefined data value into said processor identification register of said first processor, which predefined data value is common to said processing sets and is operable to mask said processor identification.

13. A method of operating a fault tolerant computer system as claimed in claim 12, wherein said predetermined condition is a reset state of at least a processing set comprising said first processor.

14. A method of operating a fault tolerant computer system as claimed in claim 13, wherein said reset state is a state asserted in said fault tolerant computer system following boot or re-boot.

15. A method of operating a fault tolerant computer system as claimed in claim 12, comprising:
    detecting an error condition of at least a processing sets comprising said first processor, and
    if said error condition is detected performing the step of loading said common predefined data value in said processor identification register of said first processor.

16. A method of operating a fault tolerant computer system comprising a plurality of processing sets, each having at least one processor, and a bridge coupled to each of said processing sets and operable to monitor a step locked operation of said processing sets, said method comprising the steps of:
    removing a processor of one of said processing sets; and
    replacing the removed processor with a replacement processor that includes:

an interface for communication with an I/O bus, and a processor identification register which is read/writeable and has stored in said register data representative of a processor identification, wherein said replacement processor is responsive to a masking condition, to write a common predefined data value received via said I/O bus into said processor identification register, wherein said predefined data value is common to said processing sets and is operable to mask data representative of a said processor identification.

17. A method of operating a fault tolerant computer system as claimed in claim 16, wherein said replacement processor is replaced by replacing one of said processing sets with a processing set having the replacement processor.

* * * * *

UNITED STATES PATENT AND TRADEMARK OFFICE
CERTIFICATE OF CORRECTION

PATENT NO. : 6,862,645 B2
APPLICATION NO. : 09/766246
DATED : March 1, 2005
INVENTOR(S) : Paul Garnett It is certified that error appears in the above-identified patent and that said Letters Patent is hereby corrected as shown below:

Column 9,
Lines 42-44, please delete "register read/writeable and is configured to store data representative of a processor identification," and substitute
-- register comprising:
    a first field which is read/writeable and which is configured to store data representative of the processor version of the processor; and
    a second field which is configured to store data representative of a configuration of the processor, --;
Line 47, please delete "sets into its processor" and substitute -- sets into said first field of its processor --;

Column 10,
Line 10, please delete "that includes a plurality" and substitute -- that comprises a plurality --;
Lines 14-16, please delete "is read/writeable and is configured to store data representative of a processor identification," and substitute
-- register comprises:
    a first field which is read/writeable and which is configured to store data representative of a processor version of the processor; and
    a second field which is configured to store data representative of a configuration of the processor, --;
Line 18, please delete "into said processor" and substitute -- into said first field of said processor --;
Lines 21-22, please delete "of a processor identification." and substitute -- of a processor version. --;
Lines 29-30, please delete "each of which processing" and substitute -- each of said processing --;
Line 31, please delete "processor, at least" and substitute -- processor, wherein at least --;
Line 33, please delete "register said method comprising the steps of" and substitute
    -- register comprising:
    a first field which is read/writeable and which is configured to store data representative of a processor version of the processor; and
    a second field which is configured to store data representative of a configuration of the processor, said method comprising: --;
Lines 38-39, please delete "into said processor" and substitute -- into said first field of process --;
Lines 41-42, please delete "said processor identification." and substitute -- said processor version. --;
Lines 53, please delete "a processing sets" and substitute -- a processing set --.
Lines 62-63, please delete "method comprising the steps of:" and substitute -- method comprising: --;

UNITED STATES PATENT AND TRADEMARK OFFICE
CERTIFICATE OF CORRECTION

PATENT NO. : 6,862,645 B2
APPLICATION NO. : 09/766246
DATED : March 1, 2005
INVENTOR(S) : Paul Garnett It is certified that error appears in the above-identified patent and that said Letters Patent is hereby corrected as shown below:

Column 11,
Lines 2-4, please delete "register which is read/writeable and has data representative of a processor" and substitute
-- register comprising:
    a first field which is read/writeable and which has data representative of a processor version of the processor stored therein; and
    a second field which has data representative of a configuration of the processor stored therein, --;
Line 7, please delete "via said I/O bus into said processor" and substitute -- via said I/O bus into said first field of said processor --;

Column 12,
Lines 2-3, please delete "said processor identification." and substitute -- said processor version. --.

Signed and Sealed this

Twenty-fifth Day of July, 2006

JON W. DUDAS
*Director of the United States Patent and Trademark Office*